United States Patent

Weder

[11] Patent Number: 5,996,313
[45] Date of Patent: *Dec. 7, 1999

[54] FLORAL GROUPING WRAPPED WITH A FLORAL SLEEVE

[75] Inventor: Donald E. Weder, Highland, Ill.

[73] Assignee: Southpac International, Inc.

[ * ] Notice: This patent is subject to a terminal disclaimer.

[21] Appl. No.: 08/948,220

[22] Filed: Oct. 9, 1997

Related U.S. Application Data

[63] Continuation of application No. 08/717,951, Sep. 23, 1996, Pat. No. 5,752,361, which is a continuation-in-part of application No. 08/455,807, May 31, 1995, which is a division of application No. 08/171,489, Dec. 21, 1993, Pat. No. 5,497,881, which is a continuation-in-part of application No. 08/095,331, Jul. 21, 1993, Pat. No. 5,428,939.

[51] Int. Cl.⁶ ............................. B65B 11/00; B65B 13/00
[52] U.S. Cl. ............................................ 53/397; 53/383.1
[58] Field of Search .................... 47/72, 41.01; 446/148; 428/9, 12, 15, 16, 43, 34.1

[56] References Cited

U.S. PATENT DOCUMENTS

| Re. 21,065 | 5/1939 | Copeman ................................ 93/2 |
| D. 259,333 | 5/1981 | Charbonneau ........................ D9/306 |
| D. 279,279 | 6/1985 | Wagner ................................. D11/143 |
| D. 301,991 | 7/1989 | Van Sant .............................. D11/149 |

(List continued on next page.)

FOREIGN PATENT DOCUMENTS

| 4231978 | 6/1979 | Australia . |
| 654427 | 1/1965 | Belgium . |
| 0050990 | 5/1982 | European Pat. Off. . |
| 0791543 | 8/1997 | European Pat. Off. . |
| 1376047 | 9/1964 | France . |
| 2036163 | 12/1970 | France . |
| 2137325 | 12/1972 | France . |
| 2272914 | 12/1975 | France . |
| 2489126 | 3/1982 | France . |
| 2610604 | 8/1988 | France . |
| 2603159 | 3/1989 | France . |
| 2619698 | 3/1989 | France . |
| 345464 | 12/1921 | Germany . |
| 513971 | 11/1930 | Germany . |
| 1166692 | 3/1964 | Germany . |
| 1962947 | 6/1971 | Germany . |
| 2060812 | 11/1971 | Germany . |
| 2748626 | 5/1979 | Germany . |
| 3445799 | 6/1986 | Germany . |
| 3829281 | 5/1989 | Germany . |
| 3911847 | 10/1990 | Germany ................................... 47/72 |
| 224507 | 4/1996 | Italy . |
| 542958 | 2/1993 | Japan . |
| 8301709 | 12/1984 | Netherlands . |
| 1000658 | 1/1996 | Netherlands . |
| 560532 | 4/1975 | Switzerland . |
| 5605 | of 1885 | United Kingdom . |
| 1204647 | 9/1970 | United Kingdom . |
| 2056410 | 3/1981 | United Kingdom . |
| 2074542 | 11/1981 | United Kingdom . |
| 2128083 | 4/1984 | United Kingdom . |
| 2252708 | 8/1992 | United Kingdom . |
| 9315979 | 8/1993 | WIPO . |

OTHER PUBLICATIONS

Exhibit A—Speed Cover Brochure, "The Simple Solution For Those Peak Volume Periods", Highland Supply Corporation, ©1989.
Exhibit B—"Speed Sheets and Speed Rolls" Brochure, Highland Supply Corporation, ©1990.

(List continued on next page.)

Primary Examiner—Michael J. Carone
Assistant Examiner—Francis T. Palo
Attorney, Agent, or Firm—Dunlap, Codding, & Rogers, P.C.

[57] ABSTRACT

A plant package, comprising a floral grouping having a bloom portion and a stem portion wherein the stem portion may have a bonding material thereon and a flexible sleeve optionally having a bonding material thereon, the sleeve being positioned about the floral grouping and the sleeve substantially surrounding and encompassing the floral grouping, forming a plant package attached to the stems of the floral grouping, of using the wrapper.

7 Claims, 3 Drawing Sheets

U.S. PATENT DOCUMENTS

| | | | |
|---|---|---|---|
| D. 335,105 | 4/1993 | Ottenwalder et al. | D11/164 |
| D. 368,025 | 3/1996 | Sekerak et al. | D9/305 |
| 524,219 | 8/1894 | Schmidt . | |
| 732,889 | 7/1903 | Paver . | |
| 950,785 | 3/1910 | Pene . | |
| 1,063,154 | 5/1913 | Bergen . | |
| 1,446,563 | 2/1923 | Hughes . | |
| 1,520,647 | 12/1924 | Hennigan . | |
| 1,525,015 | 2/1925 | Weeks . | |
| 1,610,652 | 12/1926 | Bouchard . | |
| 1,697,751 | 1/1929 | Blake | 229/87 |
| 1,863,216 | 6/1932 | Wordingham . | |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,200,111 | 5/1940 | Bensel | 229/1.5 |
| 2,278,673 | 4/1942 | Savada et al. | 154/43 |
| 2,302,259 | 11/1942 | Rothfuss | 41/10 |
| 2,323,287 | 7/1943 | Amberg | 229/53 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,688,354 | 9/1954 | Berger | 150/28 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |
| 3,022,605 | 2/1962 | Reynolds | 47/58 |
| 3,080,680 | 3/1963 | Reynolds | 47/37 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,510,054 | 5/1970 | Sanni et al. | 229/66 |
| 3,512,700 | 5/1970 | Evans et al. | 229/53 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tumchuck et al. | 47/84 |
| 4,216,620 | 8/1980 | Weder et al. | 47/72 |
| 4,248,347 | 2/1981 | Trimbee | 206/423 |
| 4,265,049 | 5/1981 | Gorewitz | 47/26 |
| 4,280,314 | 7/1981 | Stuck | 53/241 |
| 4,297,811 | 11/1981 | Stuck | 53/241 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,717,262 | 1/1988 | Roen et al. | 383/120 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,810,109 | 3/1989 | Castel | 383/105 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,074,675 | 12/1991 | Osgood | 383/122 |
| 5,105,599 | 4/1992 | Weder | 53/399 |
| 5,111,638 | 5/1992 | Weder | 53/397 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder et al. | 29/469.5 |
| 5,307,606 | 5/1994 | Weder | 53/410 |
| 5,315,785 | 5/1994 | Avôt et al. | 47/72 |
| 5,350,240 | 9/1994 | Billman et al. | 383/104 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,443,670 | 8/1995 | Landau | 156/191 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,497,881 | 3/1996 | Weder | 206/423 |
| 5,526,932 | 6/1996 | Weder | 206/423 |
| 5,572,851 | 11/1996 | Weder | 53/399 |
| 5,575,133 | 11/1996 | Weder et al. | 53/397 |
| 5,592,803 | 1/1997 | Weder | 53/397 |
| 5,595,048 | 1/1997 | Weder et al. | 53/399 |
| 5,617,703 | 4/1997 | Weder | 53/413 |
| 5,624,320 | 4/1997 | Martinez | 472/51 |
| 5,647,168 | 7/1997 | Gilbert | 47/72 |
| 5,752,361 | 5/1998 | Weder | 53/397 |

OTHER PUBLICATIONS

Exhibit C—"Color Them Happy with Highlander Products"©1992.

Exhibit D—"Costa Keeps the Christmas Spirit", Supermarket Floral, Sep. 15, 1992.

Exhibit E—"Super Seller", Supermarket Floral, Sep. 15, 1992.

Exhibit F—"Halloween", Link Magazine, Sep. 1992, 2 pages.

Exhibit G—"Now More Than Ever", Supermarket Floral, Sep. 15, 1992.

Exhibit H—Le Plant Sac Advertisement, published prior to Sep. 26, 1997.

Exhibit I—"A World of Cut Flower and Pot Plant Packaging" Brochure, Klerk's Plastic Products Manufacturing, Inc., Date unknown, 6 pages.

Exhibit J—Chantler & Chantler brochure showing Zipper Sleeve™ and Florasheet®, Date unknown, 2 pages.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar. 31, 1994, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the French patent. The French patent does not enable or disclose adhesively attaching the covering to the container. 1988.

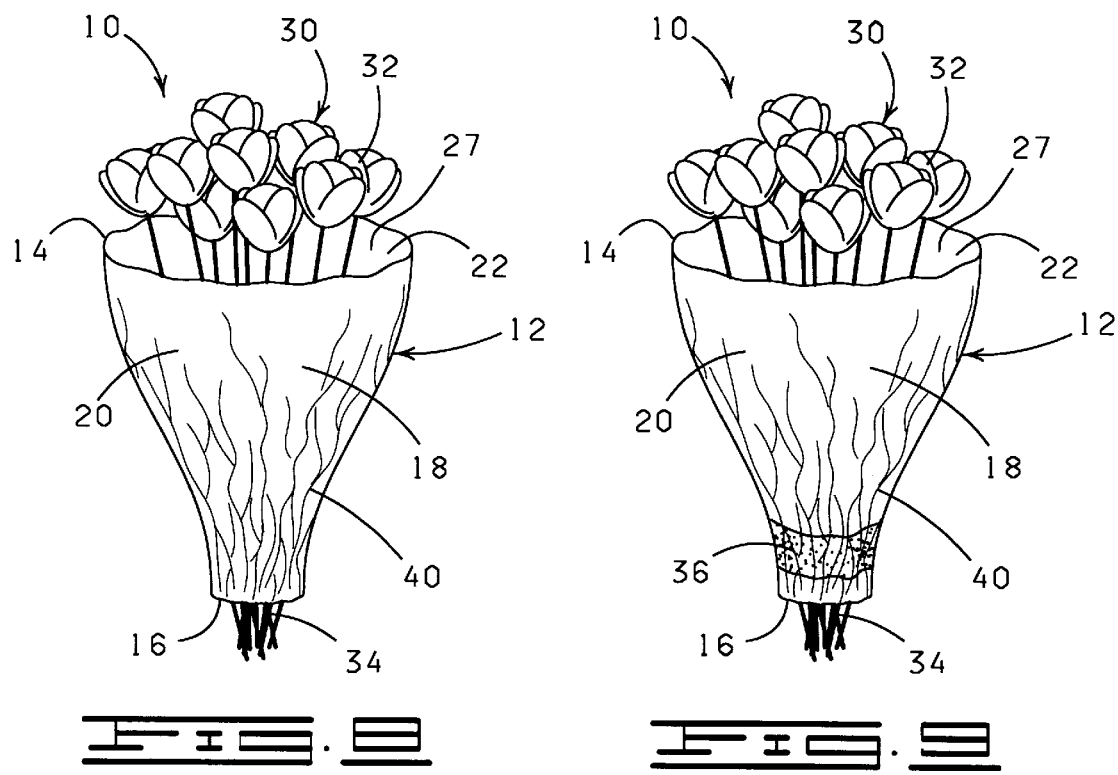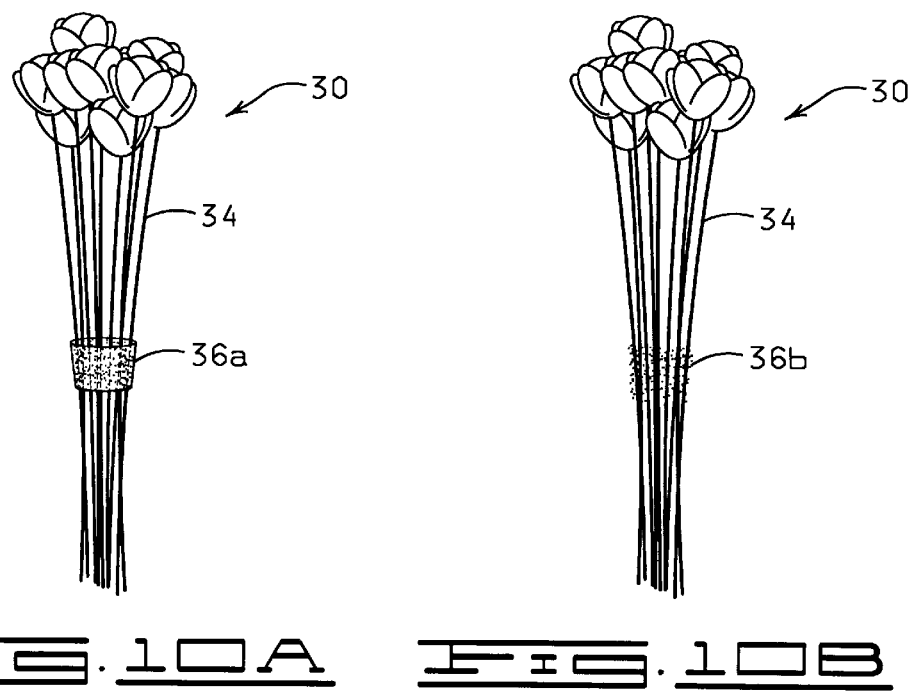

FLORAL GROUPING WRAPPED WITH A FLORAL SLEEVE

CROSS REFERENCE TO RELATED APPLICATIONS

This application is a continuation of U.S. Ser. No 08/717,951, filed Sep. 23, 1996, now U.S. Pat. No. 5,752,361; entitled Method of Wrapping a Floral Grouping, which is a continuation-in-part of application U.S. Ser. No. 08/455,807 filed May 31, 1995, entitled FLORAL GROUPING WRAPPER AND METHODS; which is a divisional of U.S. Ser. No. 08/171,489, filed Dec. 21, 1993, entitled FLORAL GROUPING WRAPPER AND METHODS, now U.S. Pat. No. 5,497,881, which is a continuation-in-part of U.S. Ser. No. 08/095,331, filed Jul. 21, 1993, entitled METHOD FOR CRIMPING A WRAPPER ABOUT A FLORAL GROUPING, now U.S. Pat. No. 5,428,939; all of the above which are hereby specifically incorporated by reference herein.

FIELD OF THE INVENTION

This invention generally relates to wrapping materials, and, more particularly to wrapping materials used to wrap floral groupings, especially wrapping materials having a generally tubular shape utilized to wrap individual flowers or a floral grouping, and the method of using same.

BRIEF DESCRIPTION OF THE DRAWINGS

FIG. 8 is a perspective view of the wrapper of FIG. 7 but showing the wrapper crimped about the stem portion of the floral grouping, the crimped portion forming overlapping folds.

FIG. 9 is a perspective view of the modified wrapper shown in FIG. 3, but showing the wrapper crimped about the stem portion of the floral grouping, the crimped portion forming overlapping folds.

FIG. 10a is a perspective view of a floral grouping having a bonding material disposed upon the stem portion.

FIG. 10b is a perspective view of an alternate embodiment of a floral grouping with a bonding material disposed on the stem portion.

DESCRIPTION OF THE PREFERRED EMBODIMENTS

The Embodiments and Methods of Use of FIGS. 1–9

Figure 1:
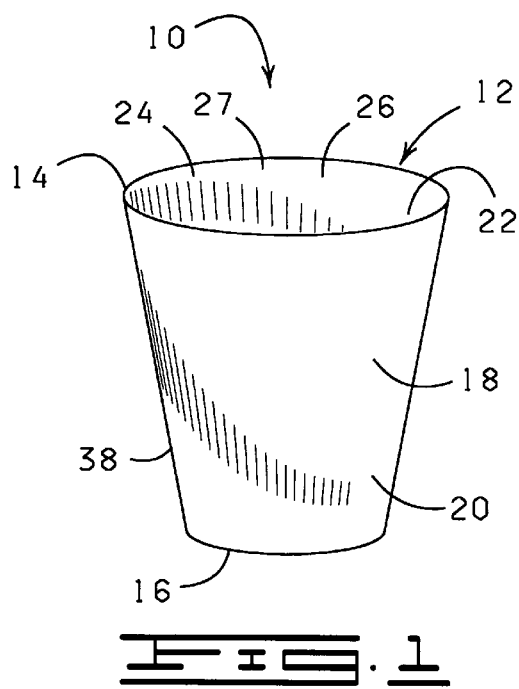
FIG. 1 is a perspective view of a wrapper for a floral grouping constructed in accordance with the present invention.

Shown in FIG. 1 and designated therein by the general reference numeral 10 is a wrapper for a floral grouping. The wrapper 10 comprises a sleeve 12 which is generally tubular in shape. The sleeve 12 has a first end 14, a second end 16, an outer periphery 18 forming an outer surface 20, and an opening 22, intersecting both the first end 14 and the second end 16 forming an inner surface 24 and defined by an inner periphery 26 and providing a retaining space 27 therein. In some embodiments (not shown), the second end 16 is closed, forming a closed end 28 (not shown), and the opening 22 only intersects the first end 14 of the sleeve 12. Such a closed lower end, when present, may comprise a gussetted bottom. Such gussets are well known in the packaging art. Sleeves, and their construction, are well known in the art and sleeves are commercially available, as are various devices and mechanisms capable of forming sleeves. Among the sleeves contemplated herein are those shown in U.S. Pat. No. 5,428,939, the specification of which is hereby incorporated herein in its entirety.

Figure 4:
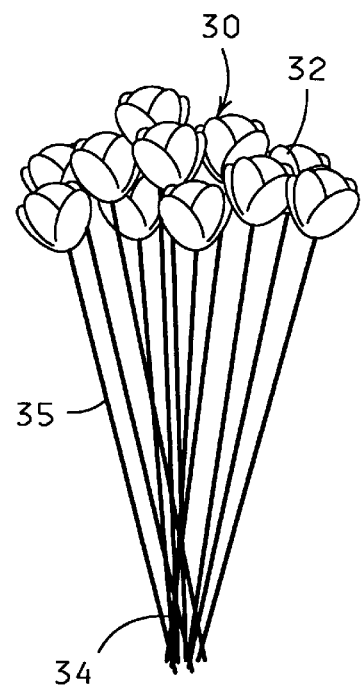
FIG. 4 is a perspective view of a floral grouping used in accordance with the present invention.

The wrapper 10 comprises both the sleeve 12 and a floral grouping 30 (FIG. 4). The sleeve is adapted to receive a floral grouping 30 within the retaining space 27.

The floral grouping 30 (FIG. 4) may be disposed in the opening 22 in the sleeve 12 and contained substantially in the receiving space 27 of the sleeve 12, as will be described in detail below. The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral arrangement. The floral grouping 30 comprises a bloom or foliage portion 32 and a stem portion 34. The floral grouping 30 further has an outer periphery 35. Further, it will be appreciated that the floral grouping 30 may consist of only a single bloom or only foliage, or a botanical item, or a propagule (not shown). The term "floral grouping" may be used interchangeably herein with the term "floral arrangement," as well as with the terms "botanical item" and/or "propagule."

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral groupings.

The term "propagule" when used herein means any structure capable of being propagated or acting as an agent of reproduction including seeds, shoots, stems, runners, tubers, plants, leaves, roots or spores.

Figure 2:
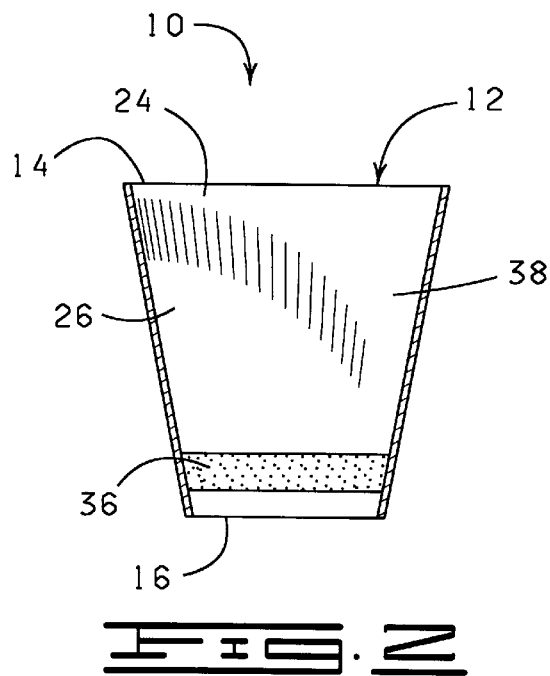
FIG. 2 is a cross-sectional view of the wrapper of FIG. 1 showing a portion of the inner surface of the sleeve having a bonding material disposed upon a portion thereof.
Figure 3:
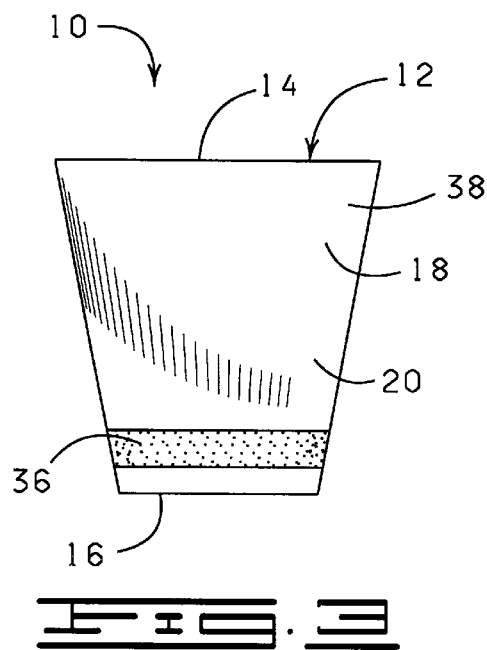
FIG. 3 is a cross-sectional view of a modified wrapper substantially similar to the wrapper of FIG. 1 but showing a portion of the outer surface of the sleeve having a bonding material disposed upon a portion thereof.

A bonding material 36 may be disposed on at least a portion of the inner surface 24 of the sleeve 12, as shown in FIG. 2, or alternatively, the bonding material 36 may be disposed on the outer surface 20 of the sleeve 12, as illustrated in FIG. 3. In a further alternative, the bonding material 36 may be disposed on both the inner surface 24 and the outer surface 20 of the sleeve 12 (not shown). In a further alternative, the bonding material 36 may be disposed on both the inner surface 24 of the sleeve and/or on an outer portion of the floral grouping 30. In addition, in another alternative, the sleeve 12 may be free of the bonding material 36, and the bonding material 36 may be disposed only on a portion of the stem portion 34 of the floral grouping 30, as discussed in more detail below.

It will be understood that the bonding material 36 may be disposed in a solid section of bonding material 36, or the bonding material 36 may be disposed in circumferentially extending strips of bonding material 36 as shown in FIGS. 2 and 3. Alternatively, the bonding material may be disposed in spots of bonding material 36, or in any other geometric, non-geometric, asymmetric, or fanciful form, and in any pattern including covering either the entire surface of the sleeve 12 and/or the floral grouping 30. The bonding material 36 may further comprise a color, or a combination of colors, and the bonding material, in a further alternative, may comprise at least a portion of a design on the sleeve 12. "Designs," as used herein, are defined as any geometric form, or any combination of geometric forms, for example, squares, round spots, triangles, rectangles, octagonals, or the like (not shown). "Designs" are further defined as any non-geometric, asymmetrical or fanciful forms, or any combination thereof, for example, but not by way of limitation, hearts, balloons, flowers, lace, slogans, logos, print (any combination of letters and/or numbers), signs, human forms (real and fictional) animal forms (real and fictional) cartoon characters, and/or plant forms.

Such a design may comprise a color, or a portion of a color, or any combination of colors. Alternatively, at least a portion of the design may be colorless, translucent, transparent, opaque, pearlescent, iridescent, or the like.

The sleeve 12 is generally tubularly shaped, but the sleeve 12 may be, by way of example but not by way of limitation, cylindrical, conical, frusto-conical (FIGS. 1–9), or a combination of both frusto-conical and cylindrical (not shown) Further, as long as the sleeve is capable of receiving a floral grouping 30, any shape of sleeve 12, whether geometric, non-geometric, asymmetrical and/or fanciful, may be utilized.

The sleeve 12 has a thickness in a range from about 0.1 mils to about 30 mils. Often, the thickness of the sleeve 12 is in a range from about 0.5 mils to about 10 mils. Frequently, the sleeve 12 has a thickness in a range from about 0.1 mils to about 5 mils. The sleeve 12 is constructed of a material 38 which is flexible.

The sleeve 12 may be constructed of a single layer of material 38 or a plurality of layers of the same or different types of materials 38. Any thickness of the material 38 may be utilized in accordance with the present invention as long as the material 38 is wrappable about an object, such as a floral grouping 30, as described herein. The layers of material 38 comprising the sleeve 12 may be connected together or laminated or may be separate layers. Materials 38 used to construct the sleeve 12 are described in U.S. Pat. No. 5,111,637 entitled "Method For Wrapping A Floral Grouping" issued to Weder et al., on May 12, 1992, which is hereby incorporated herein by reference.

Additionally, an insulating material such as bubble film, preferable as one of two or more layers, can be utilized in order to provide additional protection for the item, such as the floral grouping 30 contained therein.

As noted earlier, a bonding material 36 may be disposed on at least a portion of at least one surface of the sleeve 12. The bonding material 36 may be applied as a strip or as spots or other shapes, as described previously. One method for disposing a bonding material 36, in this case an adhesive, is described in U.S. Pat. No. 5,111,637 entitled "Method For Wrapping A Floral Grouping" issued to Weder et al., on May 12, 1992, which has been incorporated by reference herein.

The term "bonding material" when used herein means an adhesive, preferably a pressure sensitive adhesive, or a cohesive, preferably a pressure sensitive cohesive. Where the bonding material is a cohesive, a similar cohesive material must be placed on the adjacent surface for bondingly contacting and bondingly engaging with the cohesive material, for example, both on the stem portion of the floral grouping and part of the inner surface of the sleeve, for connecting the sleeve to the floral grouping. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the material and, in this instance, heat, sound waves, or vibrations, also must be applied to effect the sealing.

Alternatively, a cold seal using a cold seal lacquer is utilized upon the material to form a sleeve. The term "bonding material" includes this cold seal lacquer. The cold seal lacquer acts similar to a cohesive, and binds only to itself. The cold seal lacquer differs somewhat from a cohesive, however, in that a cold seal lacquer is not readily releasable.

In one embodiment, the sleeve 12 may be constructed from two polypropylene films (not shown). The layers of material 38 comprising the sleeve 12 may be connected together or laminated or may be separate layers. In an alternative embodiment, the sleeve 12 may be constructed from only one of the polypropylene films.

The sleeve 12 may also be constructed, in whole or in part, from a cling material (not shown). "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material 38 wrapped about at least a portion of the floral arrangement 30. This connecting engagement is preferably temporary in that the material 38 may be easily removed, i.e., the cling material "clings" to the floral arrangement 30.

The cling material is constructed and treated if necessary, from polyethylene such as Cling Wrap made by Glad®, First Brands Corporation, Danbury, Conn. The thickness of the cling material will, in part, depend upon the size of sleeve 12 and the size and nature of the floral grouping 30. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sleeve 12 is constructed from any suitable material 38 that is capable of being formed into a sleeve having a retaining space 27 capable of both receiving as well as surrounding and encompassing a floral grouping 30, and formed into a wrapper 10 as described herein. Preferably, the material 38 comprises paper (untreated or treated in any manner), cellophane, foil, polymer film, fabric (woven or nonwoven or synthetic or natural), cloth, fiber, burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material 38 comprising the sleeve 12 may vary in color. Further, the material 38 comprising the sleeve 12 may consist of designs or decorative patterns which are printed, etched, and/or embossed thereon using inks or other printing materials. An example of an ink which may be applied to the surface of the material 38 is described in U.S. Pat. No. 5,147,706 entitled "Water Based Ink On Foil And/Or Synthetic Organic Polymer" issued to Kingman on Sep. 15, 1992 and which is hereby incorporated herein by reference. As stated previously, a portion of the bonding material 36 may comprise at least a portion of a design and/or decoration.

In addition, the material 38 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sleeve 12. Moreover, each surface of the material 38 comprising the sleeve 12 may vary in the combination of such characteristics. The material 38 utilized in the construction of the sleeve 12 may be opaque, translucent, transparent, or partially clear or tinted transparent.

Figure 5:
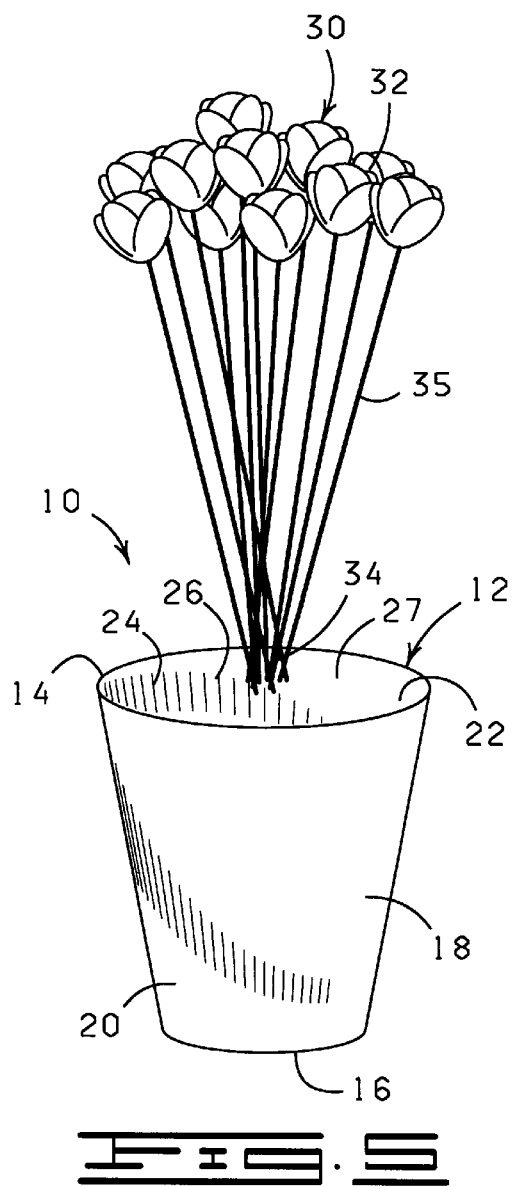
FIG. 5 is a perspective view of the wrapper of FIG. 1 and the floral grouping of FIG. 4, showing the floral grouping being disposed into the wrapper via the stem portion of the floral grouping.
Figure 6:
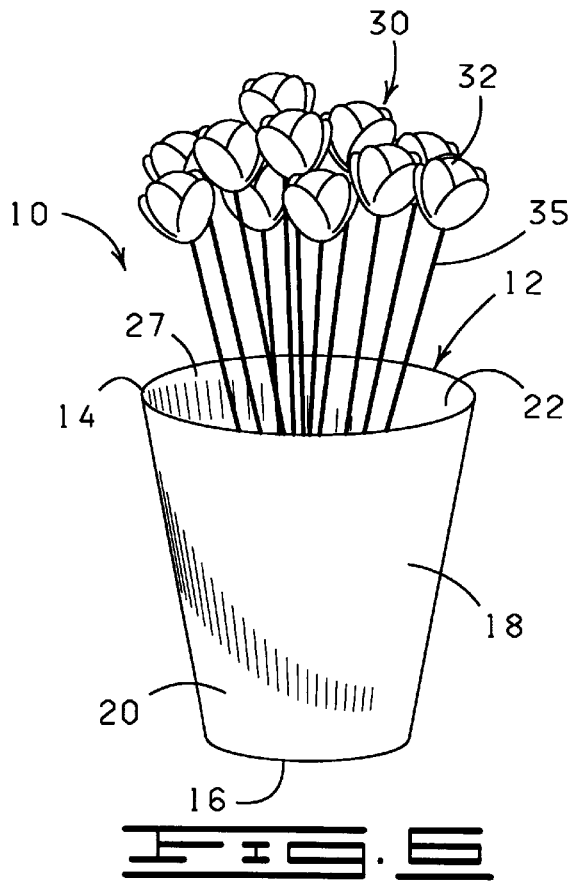
FIG. 6 is a perspective view of the wrapper of FIG. 5 but showing the stem portion disposed inside of the wrapper.
Figure 7:
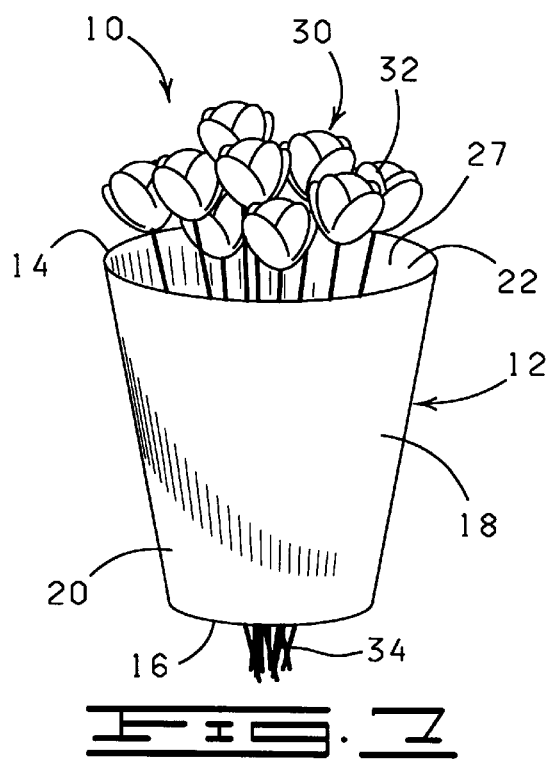
FIG. 7 is a perspective view of the wrapper of FIG. 5 but showing the floral grouping disposed inside of the wrapper with the bloom portion near the first end and the stem portion extending from the second end.

In a general method of use, illustrated in FIGS. 5–9, at least a portion of the floral grouping 30 is disposed within the sleeve 12. In some applications, the stem portion 34 of the floral grouping 30 extends into the sleeve via the open first end 14, extending through the open second end 16 of the sleeve 12 (FIGS. 5 and 6) and beyond the open second end 16. The bloom portion 32 of the floral grouping 30 is therefore disposed near the open first end 14 of the sleeve 12 and the bloom portion 32 of the floral grouping 30 is visible via the open first end 14 of the sleeve (FIGS. 7–9). In some instances, the bloom portion 32 of the floral grouping 30 may extend above the open first end 14 of the sleeve 12. In some applications, the first end 14 of the sleeve 12 may be closed if desired (not shown). In some circumstances, the second end 16 of the sleeve 12 may be closed to enclose the stem portion 34, if desired (not shown).

In one method of use (FIGS. 5–9), an operator provides a sleeve 12 (FIG. 1), and a floral grouping 30 (FIG. 4). The operator then disposes the floral grouping 30 into the sleeve 12 by opening the sleeve 12 at the first end 14 and assuring both that the opening 22 therein is in an open condition, and that the inner periphery 26 of the sleeve 12 is somewhat expanded outwardly as well, the retaining space 27 sized to receive the floral grouping 30, as shown in FIGS. 5–7. The operator then disposes the floral grouping 30 into the opening 22 in the sleeve 12 and the retaining space 27 by inserting first the stem portion 34 of the floral grouping 30 into the retaining space 27 of the sleeve 12 via the opening in the first end 14, in a manner which permits a portion of the stem portion 34 to be disposed in the retaining space 27 adjacent the second end 16 of the sleeve 12, the second end 16 generally having the narrowest diameter of the sleeve 12. In inserting the floral grouping 30 into the sleeve 12 in this manner, the bloom portion 32 is also disposed in the retaining space 27 of the sleeve 12 and the bloom portion 32 is disposed adjacent the first end 14 of the sleeve 12, the first end 14 having generally having the widest diameter. In this method, at least a portion of the stem portion 34 of the floral grouping 30 extends slightly beyond the second end 16 of the sleeve 12, and the bloom portion 32 of the floral grouping 30 is clearly visible at the open first end 14 of the sleeve 12.

The sleeve 12 may then be crimped about the floral grouping 30, as shown in FIGS. 8 and 9. The crimping operation is conducted by an operator after the floral grouping 30 is disposed in the sleeve 12 by crimping at least a portion of the sleeve 12 in the area of the stem portion 34 of the floral grouping 12, at least a portion of the bonding material 36 being disposed on this area to retain the crimped portion of the sleeve 12 in the crimped condition. Such crimping may be conducted by hand, by grasping and substantially encompassing with one or more hands the second end 16 of the sleeve 12 in the area of the bonding material 36 and evenly and firmly squeezing that portion of the sleeve 12 about the area having the bonding material 36, thereby pressing and gathering both the sleeve 12 and the bonding material 36 against itself and about the stem portion 34 of the floral grouping 30. The sleeve 12 may also be crimped by using both a crimping motion (as described above) and a turning motion to create a twisted crimping, resulting in a sleeve 12 which is both crimped as previously described, and which is twisted about at least a portion of the stem portion 34 of the floral grouping 30, the sleeve 12 near the stem portion 34 being rotated for example but not by way of limitation, about the stem portion 34 between about one-eighth of a turn to about a full turn (not shown). Methods of crimping are also shown in U.S. Pat. No. 5,361,482 and U.S. Pat. No. 5,428,9.39, both of which are hereby specifically incorporated by reference herein.

When the sleeve is crimped, a plurality of overlapping folds 40 may be formed in the crimped area. The plurality of overlapping folds 40 (only one overlapping fold designated by the numeral 40) resulting from the gathered, crimped material of the sleeve 12 may be connected. That is, all portions of the overlapping material 38 of the sleeve 12 are bondingly connected together via bonding material 36. A plurality of overlapping folds 40 may be formed by hand, during crimping, or by mechanical means. Alternatively, the crimping may be conducted in a manner in which not all of the plurality of overlapping folds 40 are bondingly connected together. It will be appreciated that the plurality of overlapping folds 40 (connected or unconnected) are formed primarily in the crimped area. Such crimping as described above may also be conducted by any device or mechanism known in the art and used for gathering or crimping materials.

Alternatively, the sleeve may remain uncrimped. The bonding material 36 disposed upon the sleeve 12 may cause the sleeve 12 to bondingly connect to portions of itself, causing the sleeve 12 to conform, either generally, or closely (depending, as will be appreciated, upon the amount of bonding material 36 and the amount of the material 38 of the sleeve 12 which overlaps and connects to itself) to the floral grouping 30.

When the floral grouping 30 is disposed in the sleeve 12 by any method described herein, or known in the art, the sleeve 12 substantially surrounds and encompasses a substantial portion of the floral grouping 30, most particularly, a portion of the stem portion 34. When the sleeve 12 is disposed about the floral grouping 30, the sleeve 12 forms a wrapper 10 which provides a decorative packaging for the floral grouping 30 contained therein.

When the floral grouping 30 is disposed in the sleeve 12 by any method described herein, or known in the art, the sleeve 12 substantially surrounds and encompasses a substantial portion of the floral grouping 30. When the sleeve 12 is disposed about the floral grouping 30, the sleeve 12 forms a wrapper 10 which provides a decorative packaging for the floral grouping 30 contained therein.

It will be appreciated that the sleeve 12 has sufficient flexibility but also sufficient rigidity to both remain in and sustain its general shape, thereby substantially surrounding and encompassing the floral grouping 30.

When a sleeve, such as the sleeve 12 which has a bonding material 36 disposed on an inner surface 26 of the sleeve as shown in FIG. 2, is crimped about a floral grouping 30 disposed therein, the bonding material 36 may engage and bondingly connect to a portion of the stem portion 34 of the floral grouping 30.

Further, as noted above, a bonding material may be disposed upon a portion of the stem portion 34 of the floral grouping 30. The bonding material may be an adhesive or cohesive, as previously noted, or may be any other bonding material described herein. An example of a floral grouping 30 having a bonding material 36a on the stem portion 34 of the floral grouping is shown in FIG. 10a. The bonding material 36a shown in FIG. 10a is a solid two sided sticky tape or strip of bonding material applied to a portion of the stem portion 34 of the floral grouping 30. Shown in FIG. 10b is a similar floral grouping 30 which has a bonding material 36b which is applied not as a preformed tape or strip but is applied directly to the stem portion 34 by brushing or spraying thereby forming a coating on a portion of the stem portion 34. Such a coating of bonding material 36b may reside not only on the outer surface of the stem portion 34 but may also coat portions of stems which are located in the interior of the bundle of stems, thereby aiding in the cohesion or adhesion of the stems together within the floral grouping. When the bonding material 36a or 36b is an adhesive, it is not necessary that the floral sleeve 12 used to wrap the floral grouping 30 have a bonding material 36 thereon, because the adhesive material 36a or 36b adheres to the inner surface 24 of the sleeve 12, allowing the sleeve 12 to be crimpingly secured about the floral grouping 30. If the bonding material 36a or 36b is a cohesive material, it is necessary that a corresponding cohesive material 36 be disposed on a portion of the inner surface 24 of the sleeve 12 so the cohesive bonding material 36a or 36b can be bonded to the sleeve 12 so that when the sleeve 12 is crimped about the floral grouping 30, the sleeve 12 will bondingly connect to a portion of the stem portion 34 of the floral grouping 30 so the sleeve can be crimpingly secured about the floral grouping 30.

Changes may be made in the construction and the operation of the various components, elements and assemblies described herein or in the steps or the sequence of steps of the methods described herein without departing from the spirit and scope of the invention as defined in the following claims.

What is claimed is:

1. A plant package, comprising:

a floral grouping and a flexible sleeve, the flexible sleeve having a first end, a second end, and outer surface, and an inner surface defining a floral grouping retaining space, and wherein the sleeve is disposed about at least a portion of a stem portion of the floral grouping such that the floral grouping is disposed in the retaining space of the sleeve;

and wherein the sleeve is crimped about a portion of the stem portion of the floral grouping along a bonding material disposed upon at least one of the inner surface of the sleeve and a portion of the stem portion of the floral grouping such that portions of the sleeve are bondingly connectd to the stem portion of the floral grouping securing the sleeve about the floragl grouping.

2. The plant package of claim 1 wherein the bonding material comprises a pressure sensitive adhesive bonding material.

3. A plant package, comprising:

a floral grouping and a flexible sleeve, the flexible sleeve having a first end, a second end, an outer surface, and an inner surface defining a floral grouping retaining space, and wherein the sleeve is disposed about at least a portion of a stem portion of the floral grouping such that the floral grouping is disposed in the retaining space of the sleeve and wherein the sleeve is crimped about a portion of the stem portion of the floral grouping along an adhesive bonding material disposed upon a portion of the stem portion of the floral grouping such that portions of the sleeve are bondingly connected to the stem portion of the floral grouping securing the sleeve about the floral grouping.

4. The plant package of claim 3 wherein the adhesive bonding material comprises a pressure sensitive adhesive bonding material.

5. A plant package, comprising:

a floral grouping and a flexible sleeve, the flexible sleeve having a first end, a second end, an outer surface, and an inner surface defining a floral grouping retaining space, and wherein the sleeve is disposed about at least a portion of a stem portion of the floral grouping such that the floral grouping is disposed in the retaining space of the sleeve and wherein the sleeve is crimped about a portion of the stem portion of the floral grouping along a cohesive bonding material disposed upon a portion of the inner surface of the sleeve and upon a portion of the stem portion of the floral grouping such that portions of the sleeve are bondingly connected to the stem portion of the floral grouping via cohesive bonding material securing the sleeve about the floral grouping.

6. A plant package, comprising:

a floral grouping and a flexible sleeve, the flexible sleeve having a first end, a second end, an outer surface, and an inner surface defining a floral grouping retaining space, and wherein the sleeve is disposed about at least a portion of a stem portion of the floral grouping such that the floral grouping is disposed in the retaining space of the sleeve and wherein the sleeve is crimped about a portion of the stem portion of the floral grouping along an adhesive bonding material disposed upon a portion of the inner surface of the sleeve such that portions of the sleeve are bondingly connected to the stem portion of the floral grouping securing the sleeve about the floral grouping.

7. The plant package of claim 6 wherein the bonding material comprises a pressure sensitive adhesive bonding material.

* * * * *